United States Patent
Liang et al.

(10) Patent No.: US 12,349,191 B2
(45) Date of Patent: Jul. 1, 2025

(54) METHODS, DEVICES, AND COMPUTER READABLE MEDIUM FOR COMMUNICATION

(71) Applicant: NEC CORPORATION, Tokyo (JP)

(72) Inventors: Lin Liang, Beijing (CN); Gang Wang, Beijing (CN)

(73) Assignee: NEC CORPORATION, Tokyo (JP)

(*) Notice: Subject to any disclaimer, the term of this patent is extended or adjusted under 35 U.S.C. 154(b) by 324 days.

(21) Appl. No.: 17/916,912

(22) PCT Filed: May 18, 2020

(86) PCT No.: PCT/CN2020/090892
§ 371 (c)(1),
(2) Date: Oct. 4, 2022

(87) PCT Pub. No.: WO2021/232201
PCT Pub. Date: Nov. 25, 2021

(65) Prior Publication Data
US 2023/0156551 A1 May 18, 2023

(51) Int. Cl.
*H04W 36/00* (2009.01)
*H04W 36/18* (2009.01)
*H04W 74/08* (2024.01)
*H04W 74/0808* (2024.01)
*H04W 76/15* (2018.01)
(Continued)

(52) U.S. Cl.
CPC ... *H04W 74/0808* (2013.01); *H04W 36/0079* (2018.08); *H04W 36/0064* (2023.05); *H04W 36/185* (2023.05)

(58) Field of Classification Search
CPC ......... H04W 74/0808; H04W 36/0079; H04W 36/0064; H04W 36/185; H04W 76/15; H04W 76/25; H04W 76/27; H04W 76/30
See application file for complete search history.

(56) References Cited

U.S. PATENT DOCUMENTS

| 10,542,475 B1 | 1/2020 | Singh et al. |
| 11,336,755 B2 * | 5/2022 | Zhang ............... H04W 28/06 |

(Continued)

FOREIGN PATENT DOCUMENTS

| CN | 103428783 A | 12/2013 |
| CN | 107041000 A | 8/2017 |

(Continued)

OTHER PUBLICATIONS

"Single/Dual RRC for Multiple Connectivity during HO", 3GPP TSG-RAN WG2 Meeting 104, R2-1816513, MediaTek Inc., Nov. 12-16, 2018, 5 pages.
International Search Report for PCT/CN2020/090892 dated Jan. 27, 2021.
Written Opinion for PCT/CN2020/090892 dated Jan. 27, 2021.
CN Office Action for CN Application No. 202080101052.1, mailed on Mar. 29, 2024 with English Translation.
Vivo, "Discussion on the RLF and HOF for DAPS", 3GPP TSG-RAN WG2 Meeting #107 R2-1909775, Aug. 16, 2019.

(Continued)

*Primary Examiner* — Ahmed Elallam
(74) *Attorney, Agent, or Firm* — Sughrue Mion, PLLC

(57) ABSTRACT

Embodiments of the present disclosure relate to communication. According to embodiments of the present disclosure, if an expiration of a data inactivity timer occurs during a handover, a terminal device maintains in a RRC connected state. The terminal device releases a link with the source network device. Further, the terminal device is able to ignore the expiration of the data inactivity timer during the handover. In this way, the impact of data inactivity of the source network device is properly handled.

6 Claims, 6 Drawing Sheets

(51) Int. Cl.
*H04W 76/25* (2018.01)
*H04W 76/27* (2018.01)
*H04W 76/30* (2018.01)

(56) References Cited

U.S. PATENT DOCUMENTS

| | | | |
|---|---|---|---|
| 11,838,926 B2* | 12/2023 | Lee | H04L 1/1887 |
| 12,089,099 B2* | 9/2024 | Jang | H04W 74/006 |
| 2013/0316713 A1 | 11/2013 | Xu et al. | |
| 2018/0124612 A1 | 5/2018 | Babaei et al. | |
| 2019/0254104 A1 | 8/2019 | Gurumoorthy et al. | |
| 2019/0373663 A1 | 12/2019 | Yu et al. | |
| 2020/0029237 A1 | 1/2020 | Kim et al. | |
| 2020/0092779 A1 | 3/2020 | Jung et al. | |
| 2020/0154480 A1 | 5/2020 | Jose et al. | |
| 2020/0170004 A1 | 5/2020 | Si et al. | |
| 2021/0250793 A1 | 8/2021 | Shi | |
| 2021/0345200 A1* | 11/2021 | Jang | H04W 74/04 |
| 2022/0039016 A1 | 2/2022 | Terry et al. | |
| 2022/0159530 A1* | 5/2022 | Kim | H04W 36/362 |
| 2023/0072832 A1 | 3/2023 | Jia et al. | |
| 2023/0156540 A1* | 5/2023 | Wang | H04W 36/0079 370/331 |
| 2023/0156817 A1* | 5/2023 | Wang | H04W 74/0841 370/329 |
| 2023/0171655 A1* | 6/2023 | Chen | H04W 36/00 370/331 |
| 2023/0189112 A1* | 6/2023 | Wu | H04W 36/305 455/437 |

FOREIGN PATENT DOCUMENTS

| | | |
|---|---|---|
| CN | 107371208 A | 11/2017 |
| CN | 110945959 A | 3/2020 |
| JP | 2021-114728 A | 8/2021 |
| JP | 2021-518726 A | 8/2021 |
| WO | 2019/135649 A1 | 7/2019 |
| WO | 2020/069114 A1 | 4/2020 |
| WO | 2020/087369 A1 | 5/2020 |
| WO | 2021/232383 A1 | 11/2021 |

OTHER PUBLICATIONS

Ericsson, "Handling consistent UL LBT failures", 3GPP TSG-RAN WG2 #109-e R2-2001207, Feb. 14, 2020.

InterDigital, "Summary of RACH and UL LBT Failure", 3GPP TSG-RAN WG2 Meeting #109-e R2-2001911, Feb. 21, 2020, pp. 1-41.

Qualcomm Incorporated, "Discussion regarding NR-U handover", 3GPP TSG-RAN WG4 RAN4#94 R4-2002132, Feb. 15, 2020, pp. 1-5.

3GPP TS 38.321 V16.0.0, Apr. 5, 2020, pp. 1-140.

3GPP TS 38.331 V17.0.0, Apr. 6, 2022, pp. 1-1224.

CN Official Communication for CN Application No. 202080101052. 1, mailed on Jul. 31, 2024 with English Translation.

Extended European Search Report dated Jun. 13, 2023 in Application No. 20936828.1.

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133 (133 total pages).

"3rd Generation Partnership Project; Technical Specification Group Radio Access Network; NR; Medium Access Control (MAC) protocol specification (Release 16)", 3GPP TS 38.321, V16.0.0, Mar. 2020, pp. 1-141 (141 total pages).

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835 (835 total pages).

JP Office Communication for JP Application No. 2022-570226, mailed on Mar. 26, 2024 with English Translation.

Vivo, "Discussion on LBT Failure Detection and Recovery During HO with DAPS and CHO", 3GPP TSG RAN WG2 #110-e R2-2004419, May 22, 2020, pp. 1-pp. 3.

Nokia, Intel Corporation (Rapporteurs), "Corrections to Mobility Enhancements", 3GPP TSG RAN WG2 #109bis-e R2-2003857, May 1, 2020, pp. 1-pp. 8.

IN Office Action for IN Application No. 202217055408, mailed on Sep. 23, 2024 with English Translation.

* cited by examiner

METHODS, DEVICES, AND COMPUTER READABLE MEDIUM FOR COMMUNICATION

CROSS REFERENCE TO RELATED APPLICATIONS

This application is a National Stage of International Application No. PCT/CN2020/090892 filed May 18, 2020.

TECHNICAL FIELD

Embodiments of the present disclosure generally relate to the field of telecommunication, and in particular, to methods, devices, and computer readable medium for communication.

BACKGROUND

In communication systems, a handover is a process in telecommunications and mobile communications in which a connected cellular call or a data session is transferred from one cell site (base station) to another without disconnecting the session. Handovers are a core element in planning and deploying cellular networks. It allows users to create data sessions or connect phone calls on the move. This process keeps the calls and data sessions connected even if a user moves from one cell site to another. During handover, there may be expected interruptions.

SUMMARY

In general, example embodiments of the present disclosure provide a solution for handling data inactivity for handover.

In a first aspect, there is provided a method for communication. The method comprises receiving, at a terminal device and from a source network device, a configuration of a data inactivity timer associated with the source network device. The method further comprises receiving from the source network device a command to handover from the source network device to the target network device, the terminal device being able to connect with the target network device while maintaining a connection with the source network device. The method also comprises in accordance with a determination that the data inactivity timer is expired, maintaining the terminal device to be in a radio resource control, RRC, connected state.

In a second aspect, there is provided a method for communication. The method comprises transmitting, at a source network device and to a terminal device, a configuration of a data inactivity timer associated with the source network device. The method also comprises transmitting to the terminal device network device a command to handover from the source network device to the target network device, the terminal device being able to connect with the target network device while maintaining a connection with the source network device. The method further comprises in accordance with a determination that the data inactivity timer is expired, releasing a link between the terminal device and the source network device.

In a third aspect, there is provided a terminal device. The terminal device comprises a processing unit; and a memory coupled to the processing unit and storing instructions thereon, the instructions, when executed by the processing unit, causing the terminal device to perform acts comprising: receiving, at the terminal device and from a source network device, a configuration of a data inactivity timer associated with the source network device; receiving from the source network device a command to handover from the source network device to the target network device, the terminal device being able to connect with the target network device while maintaining a connection with the source network device; and in accordance with a determination that the data inactivity timer is expired, maintaining the terminal device to be in a radio resource control, RRC, connected state.

In a fourth aspect, there is provided a source network device. The source network device comprises a processing unit; and a memory coupled to the processing unit and storing instructions thereon, the instructions, when executed by the processing unit, causing the source network device to perform acts comprising: transmitting, at the source network device and to a terminal device, a configuration of a data inactivity timer associated with the source network device; transmitting to the terminal device network device a command to handover from the source network device to the target network device, the terminal device being able to connect with the target network device while maintaining a connection with the source network device; and in accordance with a determination that the data inactivity timer is expired, releasing a link between the terminal device and the source network device.

In a fifth aspect, there is provided a computer readable medium having instructions stored thereon, the instructions, when executed on at least one processor, causing the at least one processor to carry out the method according to any one of the first aspect, second aspect or third aspect.

Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
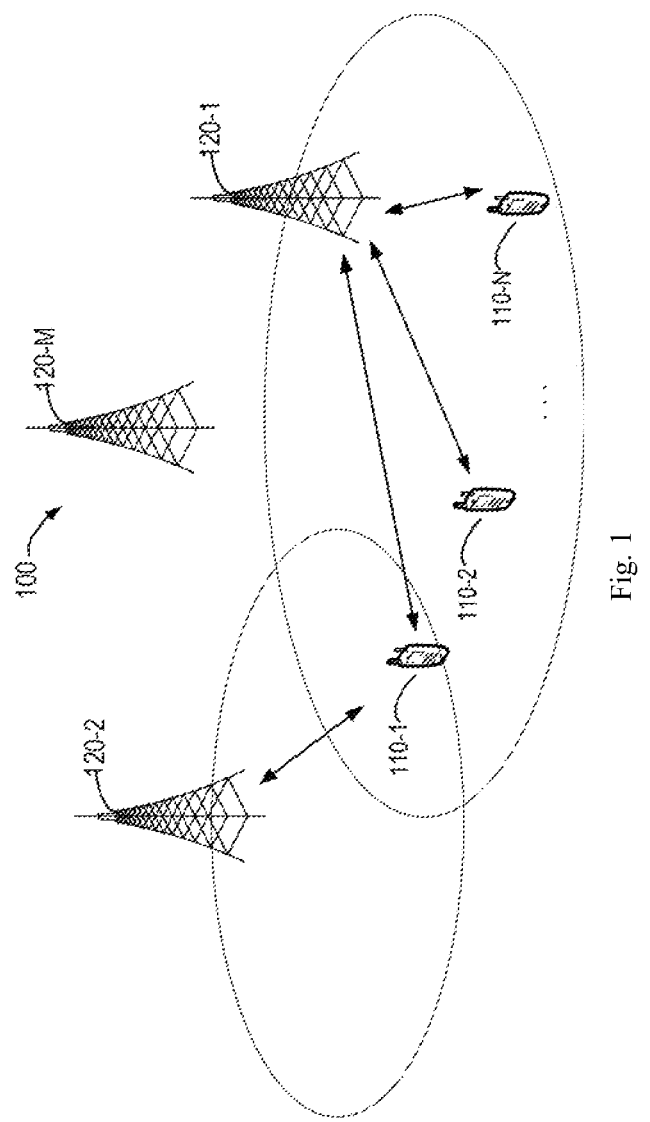
FIG. 1 is a schematic diagram of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure.

The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RH), a remote radio head (RRH), a low power node such as a femto node, a pico node, a satellite network device, an aircraft network device, and the like. For the purpose of discussion, in the following, some example embodiments will be described with reference to eNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. In the following description, the terms "terminal device", "communication device", "terminal", "user equipment" and "UE" may be used interchangeably.

Communications discussed herein may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.85G, the third generation (3G), the fourth generation (4G), 4.5G, the fifth generation (5G) communication protocols. The techniques described herein may be used for the wireless networks and radio technologies mentioned above as well as other wireless networks and radio technologies.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

To reduce handover interruption, dual active protocol stack (DAPS) handover has been introduced. DAPS Handover is a handover procedure that maintains the source gNB connection after reception of RRC message for handover and until releasing the source cell after successful random access to the target gNB.

After receiving the DAPS handover command, the terminal device may create a medium access control (MAC) entity for the target network device and may establish a radio link control (RLC) entity and an associated logical channel for each data radio bearer configured with DAPS. For a data radio bearer (DRB) configured with DAPS, the terminal device may reconfigure a packet data convergence protocol (PDCP) entity with separate security and a robust header compression (ROHC) function for the source network device and the target network devices. The terminal device may also associate the PDCP entities with the RLC entities configured by the source network device and the target network devices, respectively. The terminal device may retain the rest configuration of the source network device until releasing the connection with the source network device.

Further, a data inactivity timer has been introduced in long term evolution (LTE) and new radio (NR) communication systems to fix radio resource control (RCC) state mismatching problem. In legacy handover, the MAC entity is reset and the data inactivity timer is stopped. And the data inactivity timer may not restart until the first uplink packet is transmitted to the target network device. Therefore, the expiry of data inactivity timer does not happen during the legacy handover.

For DAPS handover, since the MAC entity associated with the source network device is not reset, and a new MAC entity associated with the target network device is established. The data inactivity timer of the MAC entity of the source network device may continue running. Therefore, it is possible that data inactivity timer of the source network device may be expired during the DAPS handover.

As the data inactivity timer configuration is still valid for the source network device, how to handle this data inactivity timer for the source network device is not clear. Meanwhile, a further data inactivity timer may also be configured for the target network device, which will result in two data inactivity timers running for two MAC entities during the DAPS handover.

Moreover, as listen-before-talk (LBT) monitoring may still be performed at the MAC entity associated with the source network device, consistent LBT failure can happen for the MAC entity associated with the source network device and the MAC entity associated with the source network device, consistent LBT failure for the source network device shall not lead to radio link failure.

Currently, if the data inactivity timer is expired, the terminal device may enter into RRC idle state. However, this is not suitable for the DAPS handover. When the data inactivity timer of the source network device is expired, the terminal device may enter into the RRC idle state. But since the target network device is still expecting to establish connection with the UE, it is not disable for the UE to go to IDLE mode.

In order to solve at least part of the aforementioned problems, new technologies in handling data inactivity for handover are needed. According to embodiments of the present disclosure, if an expiration of a data inactivity timer occurs during a handover, a terminal device maintains in a RRC connected state. The terminal device releases a link with the source network device. Further, the terminal device is able to ignore the expiration of the data inactivity timer during the handover. In this way, the impact of data inactivity of the source network device is properly handled. Further, it avoids the terminal device being in RRC idle state for the target network device.

FIG. 1 illustrates a schematic diagram of a communication system in which embodiments of the present disclosure can be implemented. The communication system 100, which is a part of a communication network, comprises a terminal device 310-1, a terminal device 110-2, . . . , a terminal device 110-N, which can be collectively referred to as "terminal device(s) 110." The number N can be any suitable integer number.

The communication system 100 further comprises network terminal device 120-1, a network device 120-2, . . . , a network device 120-M, which can be collectively referred to as "network device(s) 120." The number M can be any suitable integer number. In the communication system 100, the network devices 120 and the terminal devices 110 can communicate data and control information to each other. Only for the purpose of illustrations, the network device 120-1 can be regarded as a source network device and the network device 120-2 can be regarded as a target network device. The numbers of terminal devices and network devices shown in FIG. 1 are given for the purpose of illustration without suggesting any limitations.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Figure 2:
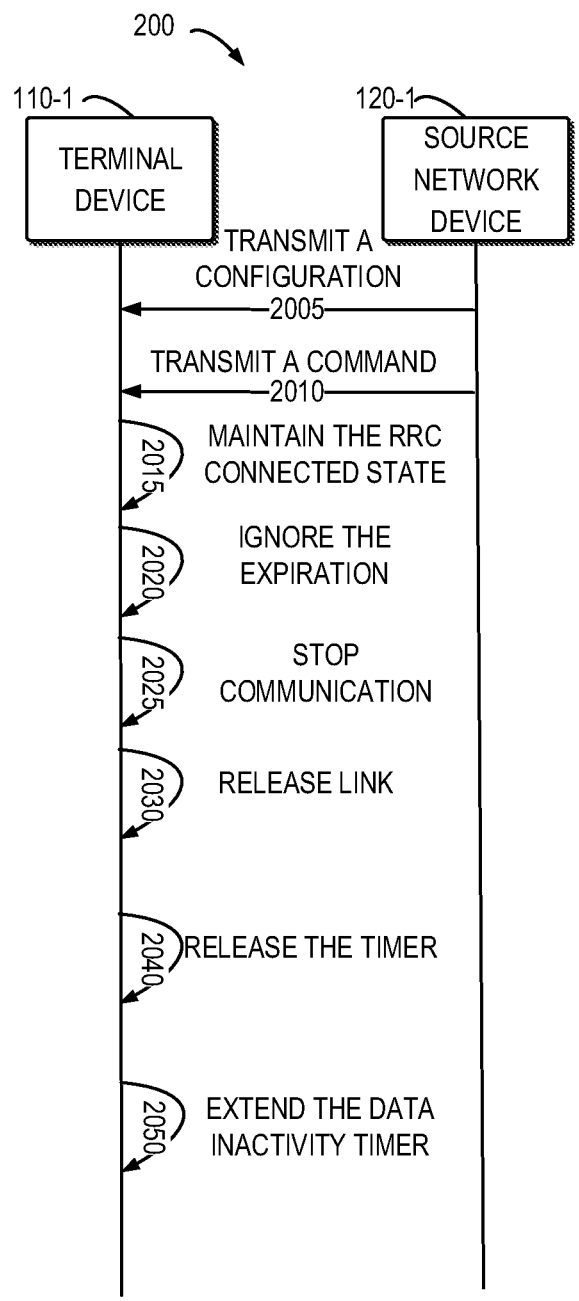
FIG. 2 illustrates a signaling flow for handling data inactivity according to some embodiments of the present disclosure.

Embodiments of the present disclosure will be described in detail below. Reference is first made to FIG. 2, which shows a signaling chart illustrating process 200 among network devices according to some example embodiments of the present disclosure. Only for the purpose of discussion, the process 200 will be described with reference to FIG. 1. The process 200 may involve the terminal device 110-1 and the network device 120-1 in FIG. 1.

The source network device 120-1 transmits 2005 to the terminal device 110-1 a configuration of a data inactivity timer associated with the source network device 120-1 to the terminal device 110-1. For example, the terminal device 110-1 may be configured by RRC with a data inactivity monitoring functionality when the terminal device 110-1 is in RRC_CONNECTED state. The data inactivity operation can be controlled by configuring the data inactivity timer. The data inactivity timer may be restarted after the terminal device 110-1 performs the data reception and/or transmission with the source network device 120-1.

The source network device 120-1 transmits 2010 a command to handover from the source network device 120-1 to the target network device 120-2. The terminal device 110-1 may be able to connect with the target network device 120-2 while maintaining a connection with the source network device 120-1. In other words, the handover may be a DAPS handover.

If the data inactivity timer is expired, the terminal device 110-1 maintains 2015 the RRC connected state. In some embodiments, if the data inactivity timer is expired, the lower layer (for example, the MAC layer) may inform the RRC layer the expiration of the data inactivity timer, for example, by transmitting an indication of the expiration. The terminal device 110-1 may determine whether the terminal device 110-1 has accessed to the target network device 120-2. For example, if the terminal device 110-1 has not accessed to the target network device 120-2, the terminal device 110-1 may ignore 2020 the expiration of the data inactivity timer and maintain itself in the RRC connected state.

Alternatively or in addition, the terminal device 110-1 may release 2025 a link between the source network device 120-1 and the terminal device 110-1. For example, the terminal device 110-1 may suspend the transmission of all DRBs with the source network device 120-1. In addition, the terminal device 110-1 may reset the MAC entity associated with the source network device 120-1. In some embodiments, if the terminal device 110-1 does not access to the target network device 120-2, the terminal device 110-1 may keep the RRC configuration of the source network device 120-1. Alternatively or in addition, the terminal device 110-1 may stop 2030 the communication on a link between the source network device 120-1 and the terminal device 110-1.

In some embodiments, the data inactivity timer may be expired after the terminal device 110-1 succeeds in accessing to the target network device 120-2. In this situation, the terminal device 110-1 may also stop 2025 the communication on the link between the source network device 120-1 and the terminal device 110-1. The terminal device 110-1 may release 2030 a link between the source network device 120-1 and the terminal device 110-1. Further, the terminal device 110-1 may release the RRC configuration of the source network device 120-1. For example, the terminal device 110-1 may reset the MAC entity associated with the source network device 120-1 and the MAC configuration associated with the source network device 120-1. For each DAPS bearer, the terminal device 110-1 may release the RLC entity associated with the source network device 120-1 and reconfigure the PDCP entity to release DAPS.

In some embodiments, if the data inactivity timer is expired after the terminal device 110-1 succeeds in accessing to the target network device 120-2, the terminal device 110-1 may ignore the expiration of the data inactivity timer and maintain itself in the RRC connected state.

In other embodiments, the data inactivity timer associated with the source network device 120-1 may be released. For example, the source network device 120-1 may transmit an indication to the terminal device 110-1. The indication may be transmitted via the RRC message before the configuration of the DAPS handover. The indication may be used to release the data inactivity timer. The terminal device 110-1 may release 2040 the data inactivity timer based on the indication. Alternatively, the data inactivity timer may be released upon an implicit indication. For example, if the RRC message of the handover is received, the terminal device 110-1 may release 2040 the data inactivity timer.

Alternatively, the source network device 120-1 may transmit a further configuration of the data inactivity timer to the terminal device 110-1. The further configuration may indicate an updated duration of the data inactivity timer. The terminal device 110-1 may extend 2050 a duration of the data inactivity timer based on the further configuration. For example, the extended duration may be longer than T304.

Figure 3:
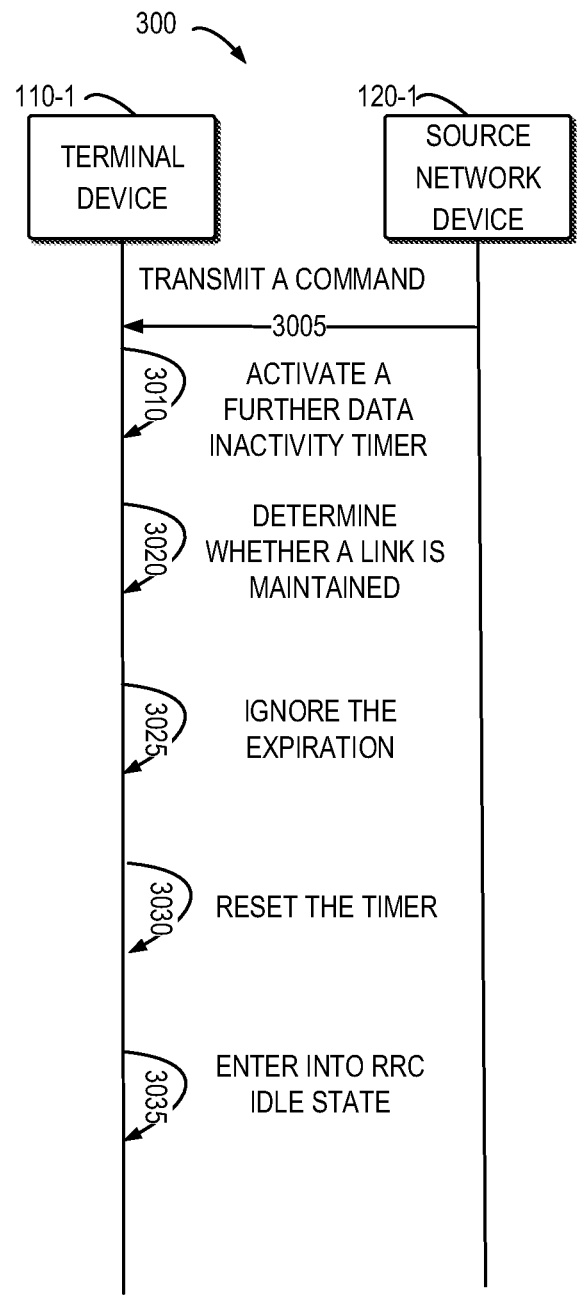
FIG. 3 illustrates a signaling flow for handling data inactivity according to some embodiments of the present disclosure.

Alternatively, after the terminal device 110-1 succeeds in random accessing to the target network device 120-1, a further data inactivity timer of the target network device 120-2 may be expired as well. Reference is made to FIG. 3, which shows a signaling chart illustrating process 300 among network devices according to some example embodiments of the present disclosure. Only for the purpose of discussion, the process 300 will be described with reference to FIG. 1. The process 300 may involve the terminal device 110-1 and the network device 120-1 in FIG. 1.

The source network device 120-1 may transmit 3005 a command to handover from the source network device 120-1 to the target network device 120-2. The terminal device 110-1 may be able to connect with the target network device 120-2 while maintaining a connection with the source network device 120-1. In other words, the handover may be a DAPS handover.

The terminal device 110-1 may activate 3010 the further data inactivity timer associated with the target network device 120-2. In some embodiments, if the further data inactivity timer is expired, the lower layer (for example, the MAC layer) may inform the RRC layer the expiration of the further data inactivity timer, for example, by transmitting an indication of the expiration. The terminal device 110-1 may enter 3035 into the RRC idle state after the further data inactivity timer is expired.

Alternatively, if the further data inactivity timer is expired, the terminal device 110-1 may determine 3020 whether the link between the source network device 120-1 and the terminal device 110-1 is maintained or not. In some embodiments, if the link between the source network device 120-1 and the terminal device 110-1 is maintained, the terminal device 110-1 may ignore 3025 the expiration of the further data inactivity timer. The further data inactivity timer may be reset 3030 at the MAC layer of the terminal device 110-1. Alternatively, if the link between the source network device 120-1 and the terminal device 110-1 has been released, the terminal device 110-1 may enter 3035 into the RRC idle state.

In other embodiments, the further data inactivity timer associated with the target network device 120-2 may not be configured before the data inactivity timer associated with the source network device 120-1 is released. For example, the command transmitted 3005 from the source network device 120-1 may exclude the configuration of the further data inactivity timer.

According to embodiment of the present disclosure, if an expiration of the data inactivity timer associated with the source network device occurs during a handover, the terminal device maintains in a RRC connected state. In this way, the impact of data inactivity of the source network device is properly handled. Further, it avoids the terminal device being in RRC idle state for the target network device. Moreover, the impact of data inactivity of the target network device is also properly handled.

Figure 4:
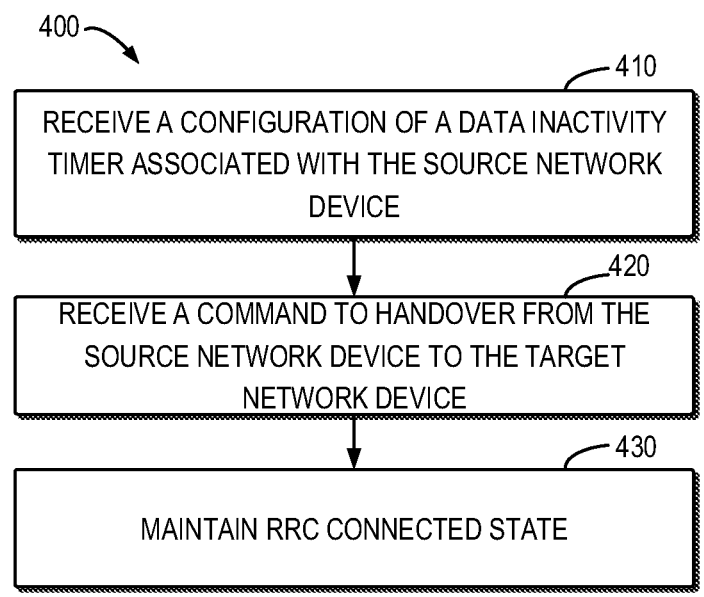
FIG. 4 is a flowchart of an example method in accordance with an embodiment of the present disclosure.

FIG. 4 shows a flowchart of an example method 400 in accordance with an embodiment of the present disclosure. Only for the purpose of illustrations, the method 400 can be implemented at a terminal device 110-1 as shown in FIG. 1.

At block 410, the terminal device 110-1 receives from the source network device 120-1 a configuration of a data inactivity timer associated with the source network device 120-1 to the terminal device 110-1. For example, the terminal device 110-1 may be configured by RRC with a data inactivity monitoring functionality when the terminal device 110-1 is in RRC_CONNECTED state. The data inactivity operation can be controlled by configuring the data inactivity timer. The data inactivity timer may be restarted after the terminal device 110-1 performs the data reception and/or transmission with the source network device 120-1.

At block 420, the terminal device 110-1 receives a command to handover from the source network device 120-1 to the target network device 120-2. The terminal device 110-1 may be able to connect with the target network device 120-2 while maintaining a connection with the source network device 120-1. In other words, the handover may be a DAPS handover.

At block 430, if the data inactivity timer is expired, the terminal device 110-1 maintains the RRC connected state. In some embodiments, if the data inactivity timer is expired, the lower layer (for example, the MAC layer) may inform the RRC layer the expiration of the data inactivity timer, for example, by transmitting an indication of the expiration. The terminal device 110-1 may determine whether the terminal device 110-1 is able to access the target network device 120-2. For example, if the terminal device 110-1 does not access to the target network device 120-2, the terminal device 110-1 may ignore the expiration of the data inactivity timer and maintain itself in the RRC connected state. Alternatively or in addition, the terminal device 110-1 may stop the communication on a link between the source network device 120-1 and the terminal device 110-1.

In some embodiments, if the data inactivity timer is expired, the terminal device 110-1 releases a link between the source network device 120-1 and the terminal device 110-1. For example, the terminal device 110-1 may suspend the transmission of all DRBs with the source network device 120-1. In addition, the terminal device 110-1 may reset the MAC entity associated with the source network device 120-1. In some embodiments, if the terminal device 110-1 does not access to the target network device 120-2, the terminal device 110-1 may keep the RRC configuration of the source network device 120-1.

In some embodiments, the data inactivity timer may be expired after the terminal device 110-1 succeeds in accessing to the target network device 120-2. In this situation, the terminal device 110-1 may also stop 2025 the communication on the link between the source network device 120-1 and the terminal device 110-1. The terminal device 110-1 may release a link between the source network device 120-1 and the terminal device 110-1. Further, the terminal device 110-1 may release the RRC configuration of the source network device 120-1. For example, the terminal device 110-1 may reset the MAC entity associated with the source network device 120-1 and the MAC configuration associated with the source network device 120-1. For each DAPS bearer, the terminal device 110-1 may release the RLC entity associated with the source network device 120-1 and reconfigure the PDCP entity to release DAPS.

In some embodiments, if the data inactivity timer is expired after the terminal device 110-1 succeeds in accessing to the target network device 120-2, the terminal device 110-1 may ignore the expiration of the data inactivity timer and maintain itself in the RRC connected state.

In other embodiments, the data inactivity timer associated with the source network device 120-1 may be released. For example, the source network device 120-1 may transmit an indication to the terminal device 110-1. The indication may be transmitted via the RRC message before the configuration of the DAPS handover. The indication may be used to release the data inactivity timer. The terminal device 110-1 may release the data inactivity timer based on the indication. Alternatively, the data inactivity timer may be released upon an implicit indication. For example, if the RRC message of the handover is received, the terminal device 110-1 may release the data inactivity timer.

Alternatively, the source network device 120-1 may transmit a further configuration of the data inactivity timer to the terminal device 110-1. The further configuration may indicate an updated duration of the data inactivity timer. The terminal device 110-1 may extend a duration of the data inactivity timer based on the further configuration. For example, the extended duration may be longer than T304.

Alternatively, after the terminal device 110-1 succeeds in random accessing to the target network device 120-2, a further data inactivity timer of the target network device 120-2 may be expired as well. In some embodiments, the terminal device 110-1 may activate the further data inactivity timer associated with the target network device 120-2. In some embodiments, if the further data inactivity timer is expired, the lower layer (for example, the MAC layer) may inform the RRC layer the expiration of the further data inactivity timer, for example, by transmitting an indication of the expiration. The terminal device 110-1 may enter 3035 into the RRC idle state after the further data inactivity timer is expired.

Alternatively, if the further data inactivity timer is expired, the terminal device 110-1 may determine whether the link between the source network device 120-1 and the terminal device 110-1 is maintained or not. In some embodiments, if the link between the source network device 120-1 and the terminal device 110-1 is maintained, the terminal device 110-1 may ignore the expiration of the further data inactivity timer. The further data inactivity timer may be reset at the MAC layer of the terminal device 110-1. Alternatively, if the link between the source network device 120-1 and the terminal device 110-1 has been released, the terminal device 110-1 may enter into the RRC idle state.

In other embodiments, the further data inactivity timer associated with the target network device 120-2 may not be configured before the data inactivity timer associated with the source network device 120-1 is released. For example, the command transmitted 3005 from the source network device 120-1 may exclude the configuration of the further data inactivity timer.

In some embodiments, the terminal device 110-1 may perform listen-before-talk (LBT) on the link between the terminal device 110-1 and the source network device 120-1. If the number of LBT failures exceeds a threshold number, if the terminal device 110-1 has not accessed to the target network device 120-2, the terminal device 110-1 may determine that the radio link failure occurs on the link. In other words, if the indication of consistent LBT failures comes from the MAC entity of the source network device 120-1, the terminal device 110-1 may consider the radio link failure to be detected. The terminal device 110-1 may stay in the RRC connected state. Alternatively or in addition, the terminal device 110-1 may stop the communication on a link between the source network device 120-1 and the terminal device 110-1. The terminal device 110-1 may release a link between the source network device 120-1 and the terminal device 110-1. For example, the terminal device 110-1 may suspend the transmission of all DRBs with the source network device 120-1. In addition, the terminal device 110-1 may reset the MAC entity associated with the source network device 120-1.

Alternatively, the terminal device 110-1 may perform the LBT on a further link between the terminal device 110-1 and the source network device 120-2. If the number of LBT failures exceeds a further threshold number, the terminal device 110-1 may determine that the radio link failure occurs on the further link. In other words, if the indication of consistent LBT failures comes from the MAC entity of the target network device 120-2, the terminal device 110-1 may consider the radio link failure to be detected. In some embodiments, the terminal device 110-1 may initiate a link recovery for recover the link.

Figure 5:
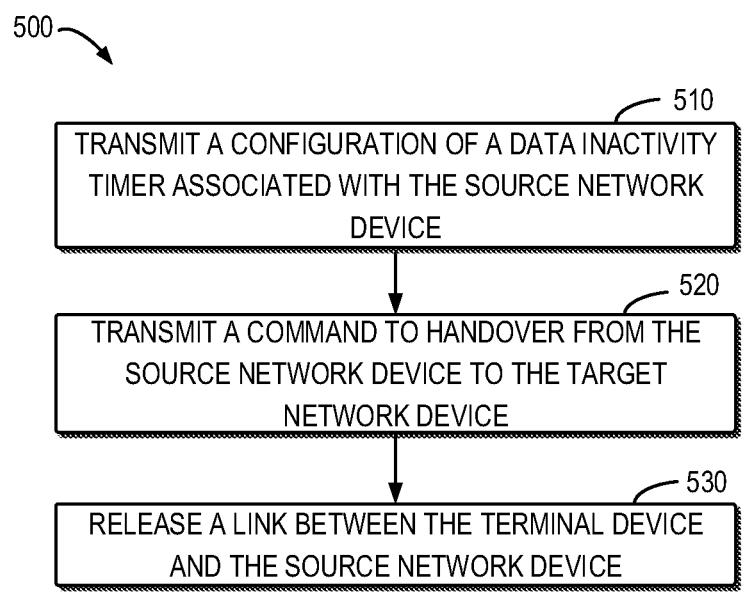
FIG. 5 is a flowchart of an example method in accordance with an embodiment of the present disclosure.

FIG. 5 shows a flowchart of an example method 500 in accordance with an embodiment of the present disclosure. Only for the purpose of illustrations, the method 500 can be implemented at a source network device 120-1 as shown in FIG. 1.

At block 510, the source network device 120-1 transmits to the terminal device 110-1 a configuration of a data inactivity timer associated with the source network device 120-1 to the terminal device 110-1. For example, the terminal device 110-1 may be configured by RRC with a data inactivity monitoring functionality when the terminal device 110-1 is in RRC_CONNECTED state. The data inactivity operation can be controlled by configuring the data inactivity timer. The data inactivity timer may be restarted after the terminal device 110-1 performs the data reception and/or transmission with the source network device 120-1.

At block 520, the source network device 120-1 transmits a command to handover from the source network device 120-1 to the target network device 120-2. The terminal device 110-1 may be able to connect with the target network device 120-2 while maintaining a connection with the source network device 120-1. In other words, the handover may be a DAPS handover.

In other embodiments, the further data inactivity timer associated with the target network device 120-2 may not be configured before the data inactivity timer associated with the source network device 120-1 is released. For example, the command transmitted from the source network device 120-1 may exclude the configuration of the further data inactivity timer.

In other embodiments, the data inactivity timer associated with the source network device 120-1 may be released. For example, the source network device 120-1 may transmit 2035 an indication to the terminal device 110-1. The indication may be transmitted via the RRC message before the configuration of the DAPS handover. The indication may be used to release the data inactivity timer. Alternatively, the data inactivity timer may be released upon an implicit indication.

Alternatively, the source network device 120-1 may transmit a further configuration of the data inactivity timer to the terminal device 110-1. The further configuration may indicate an updated duration of the data inactivity timer.

Figure 6:
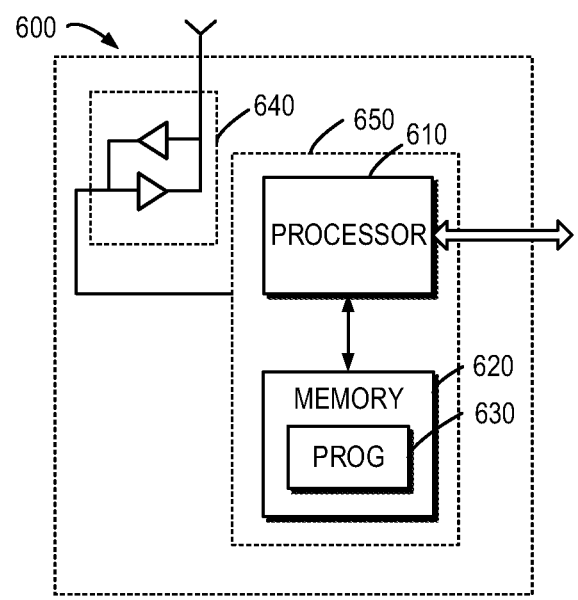
FIG. 6 is a simplified block diagram of a device that is suitable for implementing embodiments of the present disclosure.

FIG. 6 is a simplified block diagram of a device 600 that is suitable for implementing embodiments of the present disclosure. The device 600 can be considered as a further example implementation of the terminal device 110 and the network device 120 as shown in FIG. 1. Accordingly, the device 600 can be implemented at or as at least a part of the terminal device 110 or the network device 120.

As shown, the device 600 includes a processor 610, a memory 620 coupled to the processor 610, a suitable transmitter (TX) and receiver (RX) 640 coupled to the processor 610, and a communication interface coupled to the TX/RX 640. The memory 620 stores at least a part of a program 630. The TX/RX 640 is for bidirectional communications. The TX/RX 640 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 630 is assumed to include program instructions that, when executed by the associated processor 610, enable the device 600 to operate in accordance with the embodiments of the present disclosure, as discussed herein with reference to FIGS. 2 to 4. The embodiments herein may be implemented by computer software executable by the processor 610 of the device 600, or by hardware, or by a combination of software and hardware. The processor 610 may be configured to implement various embodiments of the present disclosure. Furthermore, a combination of the processor 610 and memory 620 may form processing means 650 adapted to implement various embodiments of the present disclosure.

The memory 620 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 620 is shown in the device 600, there may be several physically distinct memory modules in the device 600. The processor 610 may be of any type suitable to the local technical network, and may include one or more of general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 4-10. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device comprising:
a receiver configured to receive, from a source network device, a command to move from the source network device to a target network device for a handover procedure, the handover procedure maintaining a connection with the source network device until releasing a cell in accordance with the source network device after successful random access to the target network device; and
a processor configured to perform a listen-before-talk (LBT) on a link between the terminal device and the source network device, wherein
based on consistent LBT failure indication from a Medium Access Control (MAC) entity of the source network device,
the processor is configured to:
consider a radio link failure to be detected for the source network device, suspend transmission of all Data Radio Bearers (DRBs) associated with the source network device,
reset the MAC entity associated with the source network device, and
release the link between the terminal device and the source network device.

2. The terminal device according to claim 1, wherein
the processor is configured to perform the LBT on a link between the terminal device and the target network device, wherein
based on a consistent LBT failure indication,
the processor is configured to:
consider the radio link failure to be detected for the target network device, and initiate a recovery of the link between the terminal device and the target network device.

3. The terminal device according to claim 1, wherein
in response to receiving the command,
the processor is configured to:
create the MAC entity for the target network device,
establish a radio link control (RLC) entity for the target network device, and
establish a logical channel for the target network device.

4. The terminal device according to claim 1, wherein
the handover procedure comprises a dual active protocol stack (DAPS) handover process.

5. A communication method for a terminal device, the method comprising:
receiving, from a source network device, a command to move from the source network device to a target network device for a handover procedure, the handover procedure maintaining a connection with the source network device until releasing a cell related to the source network device after successful random access to the target network device; and
performing a listen-before-talk (LBT) on a link between the terminal device and the source network device, wherein
based on a consistent LBT failure indication from a Medium Access Control (MAC) entity of the source network device,
the method comprises:
considering a radio link failure to be detected for the source network device,
suspending transmission of all Data Radio Bearers (DRBs) associated with the source network device,
resetting the MAC entity associated with the source network device, and
releasing the link between the terminal device and the source network device.

6. The method according to claim 5, wherein
the method comprises performing the LBT on a link between the terminal device and the target network device, wherein
based on a consistent LBT failure indication,
the method comprises:
considering the radio link failure to be detected for the target network device, and
initiating a recovery of the link between the terminal device and the target network device.

* * * * *